US005442188A

United States Patent [19]

Brimbal et al.

[11] Patent Number: 5,442,188

[45] Date of Patent: Aug. 15, 1995

[54] STRIP CHART RECORDER PAPER ATTRIBUTE DETECTOR AND MONITOR

[75] Inventors: Michel Brimbal, Cleveland Heights; Kenneth Frantisak, Parma, both of Ohio

[73] Assignee: Gould Instruments Systems, Inc., Valley View, Ohio

[21] Appl. No.: 872,627

[22] Filed: Apr. 22, 1992

[51] Int. Cl.$^6$ .......... G06K 7/10

[52] U.S. Cl. .......... 250/566; 355/41; 400/583.3; 250/557

[58] Field of Search .......... 250/559, 566, 568, 571, 250/557, 570; 346/136; 355/40, 41, 68; 235/454, 462; 400/583.3, 706, 708

[56] References Cited

U.S. PATENT DOCUMENTS

| | | | |
|---|---|---|---|
| 3,146,431 | 8/1964 | Betts . | |
| 3,386,637 | 6/1968 | Green et al. | 226/100 |
| 3,556,564 | 1/1971 | Aldinger | 346/136 |
| 3,779,440 | 12/1973 | Casale et al. | 226/74 |
| 4,184,487 | 1/1980 | Peyer | 128/710 |
| 4,439,672 | 3/1984 | Salaman | 235/454 |
| 4,533,926 | 8/1985 | Foldvari et al. | 346/136 |
| 4,607,950 | 8/1986 | Ishii et al. | 355/41 |
| 4,671,661 | 6/1987 | Ott | 250/566 |
| 4,768,410 | 9/1988 | Wood | 400/583.3 |
| 4,777,515 | 10/1988 | Aikoh et al. | 355/64 |
| 4,782,365 | 11/1988 | Takagi | 355/41 |
| 4,808,832 | 2/1989 | Doggett | 250/557 |
| 4,918,484 | 4/1990 | Ujiie et al. | 355/41 |
| 4,954,910 | 9/1990 | Ueno | 358/296 |
| 4,961,086 | 10/1990 | Takenaka | 355/41 |
| 4,965,628 | 10/1990 | Olliver et al. | 355/41 |
| 5,025,269 | 6/1991 | Saeki et al. | 346/108 |
| 5,122,645 | 6/1992 | Saeki et al. | 355/41 |

*Primary Examiner*—Stephone B. Allen
*Attorney, Agent, or Firm*—Renner, Otto, Boisselle & Sklar

[57] ABSTRACT

A paper attribute detector for use in combination with a strip chart recorder includes a paper web having a plurality of connected pages. Each of the pages has electronically scannable indicia preferably on an unrecorded side of the paper. In the preferred embodiment, the indicia are realized in bar code form and are used to encode various attributes such as page number, paper quality, paper sensitivity, and so on. Indicia scanning means are provided for detecting the page indicia as the paper web travels through the recorder. In the preferred embodiment, the scanning means includes one or more electro-optical sensors. The indicia may be aligned parallel to or transverse the travel direction of the web.

16 Claims, 1 Drawing Sheet

STRIP CHART RECORDER PAPER ATTRIBUTE DETECTOR AND MONITOR

BACKGROUND OF THE INVENTION

The invention relates generally to strip chart recorders and similar apparatus. More particularly, the invention relates to apparatus and methods for detecting or monitoring one or more attributes of a strip chart recorder paper supply, such as, for example, the quantity of paper available.

Strip chart recorders commonly use a paper supply that consists of a continuous web of paper that may be stored on a roll or stacked as connected sheets or pages. Individual pages may be conveniently separated by the use of perforations or tear lines. It is important, however, that the paper supply not be exhausted during operation of the recorder. Several techniques are known for detecting the end of a paper web supply, including mechanical arms, mechanical arms in combination with a variable resistance, visual monitoring, or edge line markings that indicate the last six feet or so of paper remaining.

These known techniques have many drawbacks, one of the most important being that usually some type of visual verification must be made at the time that the paper supply is about to be exhausted. Furthermore, an operator relying on the edge line marking visual technique must not only be present, but also will not know necessarily how close the paper supply is to the end of the roll. Thus, if a particular recording operation requires more paper than the edge marked pages, an operator cannot know if sufficient paper is available. Even if the edge markings are detected electronically, the operator cannot know with certainty how much paper remains until the edge markings are detected. The other techniques generally do not have a high degree of precision. Furthermore, none of these previous techniques of quantity detection can be used for other attributes of the paper such as the type of paper, sensitivity of the paper, or paper serial number.

SUMMARY OF THE INVENTION

The present invention contemplates a paper attribute detector that precisely determines the page number of each page as the paper is consumed and, thus, determines exactly how much paper remains at any given time. The invention further contemplates a paper attribute detector that also can be used conveniently to detect attributes other than quantity or page number. In a preferred embodiment, a paper attribute detector for use in combination with a strip chart recorder includes a paper web having a plurality of connected pages, each of such pages having optically scannable indicia thereon; with each page indicia being a coded representation of one or more attributes of such page. The paper attribute detector also includes an indicia scanning means operably associated with the strip chart recorder for detecting each page indicia as the paper web travels through the strip chart recorder.

These and other aspects and advantages of the present invention will be fully understood and appreciated by those skilled in the art from the following detailed description of the best mode and preferred embodiment in view of the accompanying drawings.

DESCRIPTION OF THE PREFERRED EMBODIMENT

Figure 1:
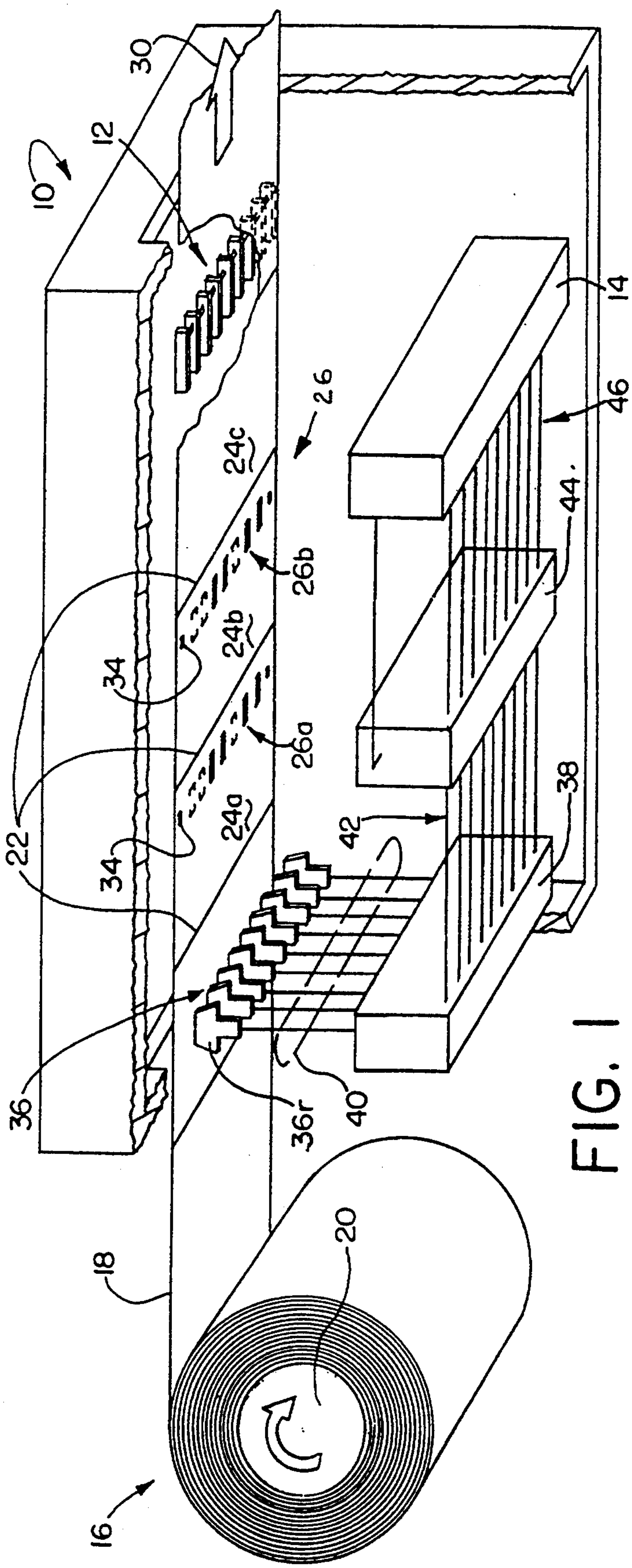
FIG. 1 is a simplified representation of a paper web and attribute detector according to the present invention in combination with a strip chart recorder.

Referring to FIG. 1, the present invention is particularly useful with a conventional strip chart recorder 10 (only partially shown in a simplified schematic). The recorder 10 typically includes one or more recording arms or heads 12, an electronic: controller 14, and a paper supply 16. The present invention can be used with virtually any type of strip chart recorder so that the particular recorder design used is largely a matter of design choice. The paper supply 16 illustrated in FIG. 1 is of the roll type in which a continuous web 18 of recording paper is fed from a roll 20. Those skilled in the art will readily appreciate, however, that the present invention also can be used with a stacked or folded paper web feed.

As depicted by the solid lines 22 in FIG. 1, the paper web 18 preferably includes a plurality of pages *24a*, *24b*, *24c* and so on. Each page forms part of the paper web 18, and preferably may be separable from the web by the use of perforations or other tear lines generally depicted by the dashed lines 22. The pages, however, need not be separable by perforations, but rather can simply be delimited by standard or predetermined page lengths or fold lines. Selection of page length and width and whether to include tear lines, fold lines or perforations is, again, largely a matter of design choice.

In accordance with the present invention, each page of the paper web 18 is provided with coded indicia *26a*, *26b*, *26c*, and so on, respectively, similar in some respects to a bar code. The page indicia, generally identified by the numeral 26, include a plurality of optically scannable marks 28. The indicia 26 preferably are placed on the underside of each page during manufacture of the paper so that the indicia do not interfere with the recorded data. Alternatively, however, the marks can be placed on the recorded side of the paper, such as for example in one of the margins.

Figure 2A:
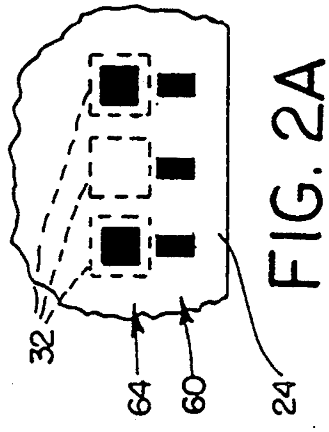
FIG. 2A is an enlarged view of some of the indicia marks 28 depicted in FIG. 2 as well as the scanning zones 32 described with respect to FIGS. 1 and 2.
Figure 2:
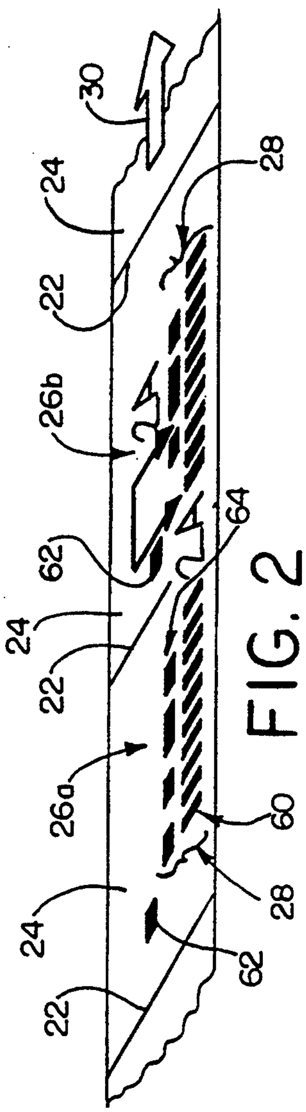
FIG. 2 is a simplified representation of an alternative embodiment wherein the paper indicia are aligned in the direction of travel of the paper web.

The marks 28 of each coded page indicia can be realized in many different ways. For example, a dark nonreflective mark can be used to represent a binary 0, and a reflective area on the paper can be used to represent a binary 1 similar in this respect to a bar code, or viceversa. Alternatively, a mark could be the absence of a light reflective surface so that light is transmitted through the paper to a sensor. Thus, as used herein, the terms "mark" or "optically scannable mark" or "indicia" refer broadly to one or more elements or absence of an element in a predetermined area or zone on each page of the paper web 18 that can be optically detected as coded information. A bar code type embodiment as shown in FIGS. 1 and 2 is preferred, therefore, but is not the only way to realize the benefits of the instant invention.

In the preferred embodiment of FIG. 1, the marks of each page indicia are preferably aligned transverse the axis or line of travel 30 of the paper web 18 through the recorder 10. Each mark is positioned in a predetermined zone 32 (shown more clearly in FIG. 2A) on the paper web 18 and preferably the location of these zones is the same from page to page. In FIG. 1, the zones 32 for the reflective marks are generally depicted in an outline type form, however, in actual practice the border markings are not required. A read mark 34 is provided that serves as a clock or trigger for the optical scanning electronics.

The recorder 10 preferably includes a bank of optical scanning elements or sensors 36, one for each indicia zone 32 for the embodiment of FIG. 1. One of the scanning elements 36r detects the read mark 34. When the read mark is detected, each of the other scanner elements or sensors 36 are properly aligned with their respective zone 32. Each element 36 detects the type of mark in its respective zone and produces an electrical signal that corresponds to the presence or absence of a reflective surface area or data mark in the zone. The output signals generated by the elements 36 are connected to a buffer 38 via a data bus 40. The buffer 38 can be realized using a comparator such as device No. LM339 manufactured by National Semiconductor. The buffer 38 produces a corresponding set of output signals on a second bus 42, and these buffered signals are then clocked into and stored by a conventional data latch 44. The read mark 34 can conveniently be used as the trigger for the latch 44 to store the data signals from the sensors 36. The latched data signals can then be read by the microprocessor 14 via a data bus 46 for further signal processing.

In the preferred embodiment, each scanning element 36 is, for example, an integral light source and detector such as part No. OPB 730 manufactured by OPTEK Technology, Inc. Each scanning element 36 directs a beam of light onto its respective zone 32 of the paper web 18. If a dark or non-reflective mark or area is present in the zone, only a small amount or no light will be returned to the detector, and the element 36 produces a first electrical output signal that may correspond to, for example, a logic 0. If the zone has no dark area mark, or contains a reflective area mark (or the paper itself functions to reflect light in the absence of a non-reflective mark), then the element 36 produces a second electrical output signal that may correspond to, for example, a logic 1. The designer may freely choose what type of mark produces what type of output signal to be interpreted by the microprocessor. Those skilled in the art will also appreciate that marks can be used that provide coded signals other than a binary code, as is typical with most bar codes.

In the embodiment of FIG. 1, each page indicia includes up to eight (8) marks representing an eight (8) bit digital word. More or less bits can be used depending on how much information is intended to be coded on each page. As an example, bits 0 through 4 can be used to code a sequential page number, bits 5 and 6 can be used to encode the paper type, bits 7 and 8 to encode paper sensitivity, and so on. The microprocessor and related electronics is, of course, programmed in a conventional manner to interpret the detected coded indicia. A display can be provided (not shown) to provide the operator a visual indication of the page number, pages remaining, and other coded information.

In the preferred embodiment, the electronics and programming requirements can be easily realized with the appropriate modifications to a conventional strip chart recorder controller. Of course, the optical scanner elements and electronics could be designed and built separately as an add-on feature for a conventional recorder. Either way, the invention provides a convenient way to precisely determine paper quantity data and other attributes with minimal operator interface.

Referring now to FIG. 2, an alternative arrangement is shown for positioning the page indicia 26 on the paper web. In this embodiment, the marks and zones are aligned parallel to the direction of travel of the paper web (in other words, parallel to a longitudinal axis of the paper web). A series of periodic and repetitive marks are provided along the edge of the paper and serve as a clock 60. A start mark 62 may also be provided which allows for the possibility, for example, that the recorder might be turned off in the middle of a page. By using the start mark, the microprocessor can be programmed to only read data after detecting the start mark. This prevents synchronization problems between the microprocessor and the data on the page.

The clock marks permit the use of a single scanning element to serial read the data marks 64 into, for example, a shift register (not shown) under timing control of the clock. Of course, the shift register can be part of the microprocessor chip if desired. Thus, in serial embodiment of FIG. 2, three scanning elements 36 could be used: one for the start mark; one for the data marks 64; and the third for the clock marks 60. Alternatively, of course, a plurality of optical scanning elements could be used to parallel read groups of the data marks. The parallel indicia configuration of FIG. 2 can conveniently be positioned in the margin on the recorded side of the paper web if desired, or on the unrecorded side of the paper as represented in FIG. 1.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A paper attribute detector for use in combination with a strip chart recorder comprising:

a paper web having a plurality of connected paper pages, each of said paper pages having corresponding scannable indicia thereon, each paper page indicia being a coded representation of one or more attributes of said paper of said corresponding paper page;

and indicia scanning means operably associated with the strip chart recorder for detecting each page indicia as said paper web travels through the strip chart recorder with said page indicia being aligned transverse a travel axis of the paper web.

2. The paper attribute detector according to claim 1 wherein one of said attributes is a unique page number.

3. The paper attribute detector according to claim 1 wherein said page indicia are located on a recorded or unrecorded side of each of said pages.

4. The paper attribute detector according to claim 1 wherein each page indicia includes a plurality of optical scanning zones with each zone containing a light reflective or non-reflective area to provide digitally coded data marks, there being at least one zone functioning as a read zone.

5. The paper attribute detector according to claim 4 wherein said page indicia zones are aligned transverse a travel axis of the paper web.

6. The paper attribute detector according to claim 5 wherein said indicia zones are linearly aligned.

7. The paper attribute detector according to claim 6 wherein said indicia scanning means includes at least one photoelectric sensor positioned to overlap each zone, each of said at least one photoelectric sensor detecting a reflective or non-reflective area in its respective zone when said read mark passes by and is detected by a read sensor.

8. The paper attribute detector according to claim 7 wherein said page indicia are generally in the form of a bar code.

9. The paper attribute detector according to claim 1 wherein said page indicia are arranged in a predetermined manner with respect to travel direction of said paper web.

10. In combination, a strip chart recorder, a paper web supply and a paper attribute detector, said strip chart recorder having means for transferring said paper web past one or more recording elements, said paper web having a plurality of connected pages, each of said pages having corresponding page indicia thereon, said page indicia including a plurality of electronically detectable marks with at least one mark serving as a read timing mark, said page indicia being arranged in a predetermined manner on each page and with respect to the direction of travel of said paper web, said page indicia being a digitally coded representation of one or more attributes of said paper of said corresponding page, said paper attribute detector including means for detecting said page indicia when said read mark is detected, and wherein said marks for each page indicia are linearly aligned transverse a travel axis of said paper web and are parallel read by a plurality of electro-optical sensors, each of said marks being positionable in a predetermined detection zone, there being a separate sensor for each of said zones.

11. The combination of claim 10 wherein said detecting means includes at least one electro-optical sensor having a light source and light detector.

12. The combination of claim 11 wherein said page indicia are in bar code form and encode at least a page number attribute.

13. The combination of claim 12 wherein said marks for each page indicia are linearly aligned transverse a travel axis of said paper web and are parallel read by a plurality of electro-optical sensors, each of said marks being positionable in a predetermined detection zone, there being a separate sensor for each of said zones.

14. The combination of claim 12 wherein said page indicia are located on an unrecorded side of said paper web.

15. A method of determining paper attributes for a paper web supply, said paper web having a plurality of connected pages, used with a strip chart recorder comprising the following steps:

1) digitally encoding one or more attributes of each of said connected pages of said paper web on said page of the paper web with detectable indicia wherein said indicia being aligned transverse a travel axis of the paper web;
2) electronically detecting said indicia for each of said connected pages and decoding the same to determine said paper attributes; and wherein the step of electronically detecting the indicia includes the step of using electro-optical means to detect a bar code on each page, and using the bar code to encode at least a page number attribute; and wherein the step of electronically detecting the indicia is performed by a parallel read of the bar code using said electro-optical means.

16. The method according to claim 15 wherein the step of electronically detecting the indicia includes the step of using electro-optical means to detect a bar code on each page, and using the bar code to encode at least a page number attribute.

* * * * *